3,574,697
HALOALKYLENE BISTHIOCYANATES
Richard Parke Welcher, Old Greenwich, Conn., assignor to American Cyanamid Company, Stamford, Conn.
No Drawing. Filed May 27, 1968, Ser. No. 732,049
Int. Cl. C07c 161/02
U.S. Cl. 260—454                 10 Claims

ABSTRACT OF THE DISCLOSURE

Haloalkylene bisthiocyanates of the formula

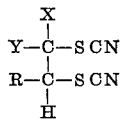

in which X is halogen, Y is hydrogen, halogen, phenyl or alkyl of 1 to 16 carbon atoms, R is hydrogen, phenyl, lower alkylphenyl, or alkyl of 1 to 16 carbon atoms, and cycloaliphatic bis-thiocyanates in which R and Y represent the residue of a cycloaliphatic ring of from 5 to 10 carbon atoms are prepared by reacting thiocyanogen with the corresponding halo-olefins. The new haloalkylene bisthiocyanates are highly active bactericides, fungicides and algicides and are effective in alkaline waters as well as under neutral and acid conditions.

---

This invention is directed to a new class of halogen-containing bisthiocyanates that are effective biocides. The invention includes the compounds themselves and their methods of preparation; biocidal processes and compositions wherein they are employed are described and claimed in the copending application of Richard P. Welcher and Charles F. Hinz, Ser. No. 732,019 filed concurrently herewith.

The new halogen-containing bisthiocyanates of my invention are defined by the formula

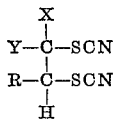

in which X is halogen, Y is hydrogen, halogen, phenyl or alkyl of from 1 to 16 carbon atoms and R is hydrogen, phenyl, lower alkylphenyl or alkyl of from 1 to 16 carbon atoms or, when taken with Y, the hydrocarbon residue of a cycloaliphatic ring of from 5 to 10 carbon atoms.

Compounds corresponding to the above formula wherein R and Y are either hydrogen or alkyl radicals of from 1–16 carbon atoms constitute a preferred group. Of these, the compounds wherein both R and Y are hydrogen, those in which one of R and Y is hydrogen and the other an alkyl radical of from 1–16 carbon atoms, and those wherein both R and Y are alkyl radicals, but when taken together contain a total of from 2–16 carbon atoms are of greatest practical importance.

It is an important advantage of the new compounds that they are easily prepared from readily available starting materials. Thus, they can be produced by reacting the corresponding halogen-substituted olefins with thiocyanogen in an organic solvent system and in the presence of a free radical initiator such as a free radical catalyst or a source of actinic light. The thiocyanogen may be generated in situ by the reaction of a metal thiocyanate such as an alkali metal, ammonium or alkaline earth metal thiocyanate with an added oxidizing agent such as a free halogen or hydrogen peroxide, or it may be prepared separately and then admixed with the halogen-containing olefin. The most suitable solvents for the reaction are benzene, toluene, ortho-xylene, meta-xylene, mixed xylenes, and other liquid mononuclear aromatic hydrogen hydrocarbons, organic acids such as glacial acetic acid, and halogenated hydrocarbons such as orthodichlorobenzene. Less suitable solvents are aliphatic hydrocarbons and anhydrous alcohols such as methanol. Suitable catalysts are diisopropyl peroxydicarbonate or azo-type catalysts such as azobisisobutyronitrile or light from a mercury vapor lamp.

The reaction is preferably carried out at a temperature below thiocyanogen polymerizing temperatures; that is, at a temperature or temperature range lower than that at which thiocyanogen will react with itself by polymerization faster than it will react with the halo-olefin used. Reaction temperatures higher than 40° C. should therefore be avoided. Temperatures within the range of 20°–40° C. can sometimes be used, but temperatures below 20° C. are preferred.

The new compounds of the invention are therefore produced by the reaction

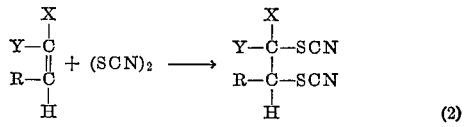  (2)

wherein R, X and Y are as defined above. It will be understood that X may be any halogen; i.e. it may be chlorine, fluorine, bromine or iodine, although the chlorine-containing compounds are cheapest and are therefore usually preferable. Similarly, in the dihalogen bisthiocyanates of the invention Y may be chlorine, bromine, iodine, or fluorine. This reaction proceeds smoothly at temperatures as low as 0° C. and good yields are obtained in the preferred operating range of 5° to 15° C.

All of the compounds of the invention are active biocides. Those in which X is a halogen and Y is hydrogen, and also those in which X and Y are halogen atoms, are active bactericides and are effective against such microorganisms as *Aerobacter aerogenes, Bacillus mycoides* and *Pseudomonas aeruginosa*. They either kill or inhibit growth of these and other similar bacteria in water at high dilutions on the order of 2 to 5 parts per million or more and in slightly acid, neutral and alkaline media. They are particularly noteworthy because of their activity in alkaline media (pH up to about 8.5) which are known to be favorable to some bacterial growth and consequent slime formation in paper mill white water. All of the new compounds of the invention are also active antifungal agents, being effective against such fungi as *Aspergillus flavus* and *Aspergillus niger*. They have also been found effective in controlling green algae (Chlorella) at high dilutions. Details of their activity against these and other micro-organisms are given in the copending application of Welcher and Hinz referred to above.

Although the invention is not to be limited by any theory of operation I believe that both the biocidal effectiveness of my new compounds and their stability in alkalies may be due, at least in part, to the presence therein of both a halogen atom and a thiocyanogen group attached to the same carbon atom of a saturated aliphatic chain that also has thiocyanogen attached to the next carbon atom. In this position the halogen evidently promotes the biocidal activity of these compounds and also imparts a stability against decompositions by alkalies that is not possessed, for example, by geminal alkylene bisthiocyanates.

Particular compounds illustrating suitable substituents X, Y, and R in the bisthiocyanates of the invention, and in the starting olefins from which they are prepared, are given in the following examples. It will be understood,

EXAMPLE 1

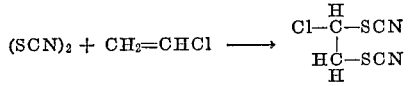

A reaction flask was charged with a mixture of 475 grams of glacial acetic acid and 25 grams of acetic anhydride and 41 grams of finely divided potassium thiocyanate was added. A total of 15 grams of chlorine gas was then introduced with agitation.

When the formation of thiocyanogen was complete there was added 16 grams of vinyl chloride over a period of 2 hours while maintaining the mixture at 15°–20° C. and irradiating it with a 450-watt high pressure mercury vapor lamp. The product was then filtered and diluted with 5 parts of water and extracted with methylene chloride.

The solvent was removed from the dry extract to give 28.76 grams of 1-chloroethylene bisthiocyanate, a 76% yield.

EXAMPLE 2

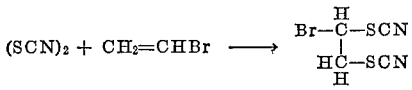

The procedure of Example 1 was repeated in all material respects but 27.4 grams of vinyl bromide were substituted for the vinyl chloride. There was obtained 46.2 grams of 1-bromoethylene bisthiocyanate.

EXAMPLE 3

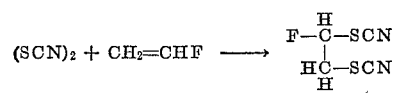

The procedure of Example 1 was again repeated substituting 12 grams of vinyl fluoride for the vinyl chloride. There was obtained 28.7 grams of 1-fluoroethylene bisthiocyanate.

EXAMPLE 4

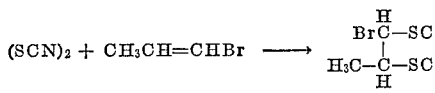

A solution of 24.2 grams of 1-bromo-1-propene in 250 grams of benzene was prepared and 16.2 grams of sodium thiocyanate were added and dissolved. The solution was cooled to 5° C. and 32 grams of bromine dissolved in 100 grams of benzene was added slowly and with stirring. When the reaction was complete the solvent was removed and the product was washed and dried. There was obtained 35.6 grams of 1-bromopropylene 1,2-bisthiocyanate.

EXAMPLE 5

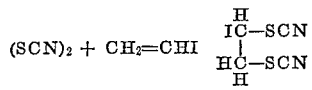

The procedure of Example 1 was again repeated but 39.4 grams of vinyl iodide were substituted for the vinyl chloride. There was obtained 27.8 grams of 1-iodoethylene bisthiocyanate.

EXAMPLES 6–15

The procedure of Example 1 is used to prepare the additional bisthiocyanates shown in the following table. The olefinic chlorides used as starting materials are prepared by the dehydrohalogenation of the corresponding paraffin or cycloparaffin polyhalides as is described, for example, in "Synthetic Organic Chemistry" by R. B. Wagner and H. D. Zook, (John Wiley & Sons Inc., 1953) page 36.

TABLE 1.—CHLOROALKYLENE BISTHIOCYANATES $$(SCN)_2 + Y-\underset{R}{\underset{|}{C}}=CH \longrightarrow Y-\underset{\underset{H}{|}}{\underset{|}{\overset{Cl}{C}}-SCN}\underset{}{\overset{}{}}$$
$$\phantom{(SCN)_2 + Y-C=CH \longrightarrow } R-\underset{H}{\underset{|}{C}}-SCN$$

| Example No. | Product | Starting material |
|---|---|---|
| 6 | 1-chloropropylene-1,2-bisthiocyanate $Cl.CH.SCN$ $H_3C\overset{|}{C}H.SCN$ | 1-chloro-1-propene $CH_3.CH=CHCl$ |
| 7 | 2-chlorobutylene-2,3-bisthiocyanate $Cl$ $H_3C.\overset{|}{C}-SCN$ $H_3C.\overset{|}{C}-SC$ $\overset{|}{H}$ | 2-chloro-2-butene $\underset{CH_3.}{\overset{H}{C}}=\underset{CH_3}{\overset{Cl}{C}}$ |
| 8 | 1-chlorodecylene-1,2-bisthiocyanate $Cl.\overset{H}{\underset{|}{C}}-SCN$ $C_8H_{17}.\overset{|}{\underset{H}{C}}-SCN$ | 1-chloro-1-decene $CH_3(CH_2)_7.CH=CHCl$ |
| 9 | 1-chlorohexadecylene-1,2-bisthiocyanate $Cl.CH.SCN$ $C_{14}H_{29}.\overset{|}{C}H.SCN$ | 1-chloro-1-hexadecene $CH_3(CH_2)_{13}CH=CH.Cl$ |
| 10 | 1-chlorocyclohexylene-1,2-bisthiocyanate (structure) | 1-chloro-1-cyclohexene (structure) |
| 11 | 1-chloro-2-phenylethylene-1,2-bisthiocyanate $Cl.CH.SCN$ $C_6H_5\overset{|}{C}H.SCN$ | β-Chlorostyrene $C_6H_5.CH=CH.Cl$ |
| 12 | 1-chloro-2-o-tolylethylene-1,2-bisthiocyanate $Cl.CH.SCN$ $CH_3.C_6H_4\overset{|}{C}H.SCN$ | β-Chloro-2-methylstyrene $CH_3.C_6H_4.CH=CH.Cl$ |
| 13 | 1,1-dichloroethylene-1,2-bisthiocyanate $Cl$ $Cl-\overset{|}{C}-SCN$ $\overset{|}{C}H_2.SCN$ | 1,1-dichloroethylene $CH_2=C:Cl_2$ |

The following fluorine-containing bisthiocyanates are prepared by the procedure of Example 1 using the starting materials indicated. Citations to literature showing the preparation of these starting materials are given.

TABLE 2.—FLUOROALKYLENE BISTHIOCYANATES

| Ex. | Product | Starting material | |
|---|---|---|---|
| 14 | 2-fluoropropylene-1,2-bisthiocyanate $CH_2.SCN$ $H_3C.\overset{|}{\underset{F}{C}}-SCN$ | 2-fluoropropene $CH_2=CF.CH_3$ | J.A.C.S. 75, 4834 (1953). |
| 15 | 2-fluorobutylene-1,2-bisthiocyanate $F$ $CH_3CH_2\overset{|}{C}SCN$ $\overset{|}{C}H_2SCN$ | 2-fluoro-1-butene $CH_2=CF.CH_2.CH_3$ | Ind. Eng. Chem. 39, 418. |

All of the above-described 1-haloalkylene-1,2-bis-thiocyanates, and also the 1,1-dihaloalkylene-1,2-bisthiocyanates, are stable in aqueous alkaline solutions at pH values from 7.1 to 9.0, and can therefore be used to suppress the growth of bacteria, fungi and algae in alkaline waters such as in the white water of paper mills using alkaline fillers and sizing agents. This is an unusual and unexpected property, for 1,2-dibromoethylene-1,2-bisthiocyanate, and also the 1,2-dibromo-1,2-dithiocyanoethane described in U.S. Patent No. 3,212,963, are known to be unstable in even slightly alkaline solutions. In fact, the former compound decomposes rapidly in aqueous solutions having an initial pH of 7.0; only its acidified solutions are stable.

What I claim is:

1. Haloalkylene bisthiocyanates of the formula

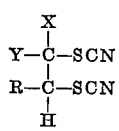

in which X is halogen, Y is hydrogen, halogen, phenyl or alkyl of from 1 to 16 carbon atoms, and R is a member of the group consisting of hydrogen, phenyl, lower alkylphenyl, alkyl of 1 to 16 carbon atoms and, when taken with Y, the hydrocarbon residue of a cycloaliphatic ring of from 5 to 10 carbon atoms.

2. Haloalkylene bisthiocyanates of the formula

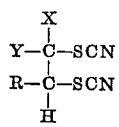

in which X is halogen, Y is hydrogen or alkyl of from 1 to 16 carbon atoms and R is hydrogen or alkyl of from 1 to 16 carbon atoms.

3. A haloalkylene bisthiocyanate according to claim 2, 1-chloroethylene bisthiocyanate.
4. A haloalkylene bisthiocyanate according to claim 2, 1-iodoethylene bisthiocyanate.
5. A haloalkylene bisthiocyanate according to claim 2, 1-bromoethylene bisthiocyanate.
6. A haloalkylene bisthiocyanate according to claim 2, 1-fluoroethylene bisthiocyanate.
7. A haloalkylene bisthiocyanate according to claim 2, 1-bromopropylene 1,2-bisthiocyanate.
8. A haloalkylene bisthiocyanate according to claim 2, 2-chlorobutylene bisthiocyanate.
9. A haloalkylene bisthiocyanate according to claim 1, 1,1-dichloroethylene bisthiocyanate.
10. A haloalkylene bisthiocyanate according to claim 1, 1-chloro-2-phenylethylene-1,2-bisthiocyanate.

References Cited

UNITED STATES PATENTS

| | | | |
|---|---|---|---|
| 2,077,478 | 4/1937 | Hollander et al. | 260—454 |
| 2,502,507 | 4/1950 | Coffman et al. | 260—454 |
| 2,639,291 | 5/1953 | Pfann | 260—454 |
| 3,308,150 | 3/1967 | Stahly | 260—454 |
| 3,314,983 | 4/1967 | Stahly | 260—454 |
| 3,433,737 | 3/1969 | Wehner | 260—454 |
| 3,300,375 | 1/1967 | Wehner | 424—302 |

OTHER REFERENCES

Wagner et al.: "Synthetic Organic Chemistry," New York, John Wiley & Sons (1935), pp. 35–37.

LEWIS GOTTS, Primary Examiner

G. HOLLRAH, Assistant Examiner

U.S. Cl. X.R.

424—302; 71—67, 104; 23—151; 162—161; 204—158; 210—64